US012605731B2

(12) United States Patent
Moretti

(10) Patent No.: US 12,605,731 B2
(45) Date of Patent: Apr. 21, 2026

(54) DEVICE FOR DISPENSING A FLUID SUBSTANCE

(71) Applicant: LUMSON S.p.A., Capergnanica (IT)

(72) Inventor: Matteo Moretti, Crema (IT)

(73) Assignee: LUMSON S.p.A., Capergnanica (IT)

( * ) Notice: Subject to any disclaimer, the term of this patent is extended or adjusted under 35 U.S.C. 154(b) by 106 days.

(21) Appl. No.: 18/657,326

(22) Filed: May 7, 2024

(65) Prior Publication Data

US 2024/0375136 A1 Nov. 14, 2024

(30) Foreign Application Priority Data

May 8, 2023 (IT) ........................ 102023000009144

(51) Int. Cl.
*B05B 11/10* (2023.01)

(52) U.S. Cl.
CPC ................................ *B05B 11/1047* (2023.01)

(58) Field of Classification Search
CPC ............ B05B 11/0038; B05B 11/0054; B65D 77/0493
USPC .......................................................... 222/401
See application file for complete search history.

(56) References Cited

U.S. PATENT DOCUMENTS 4,569,612 A * 2/1986 Schwartzman ....... B05C 17/002 401/206
6,406,207 B1 * 6/2002 Wiegner ............. B05B 11/1067 401/187
6,505,986 B1 * 1/2003 Oder ...................... B65D 47/42 222/211
9,908,130 B2 3/2018 Moretti
11,266,220 B2 3/2022 Megaro
2010/0078435 A1 4/2010 Wang
2011/0174764 A1 * 7/2011 Moretti ................... B29C 49/62 493/95
2019/0318217 A1 * 10/2019 Moretti .................. A45D 40/18
2022/0023901 A1 * 1/2022 El Hassain ......... B05B 11/0054

FOREIGN PATENT DOCUMENTS

EP 4000746 A1 5/2022

* cited by examiner

*Primary Examiner* — Jeremy Carroll
(74) *Attorney, Agent, or Firm* — Dickinson Wright PLLC; Andrew D. Dorisio

(57) ABSTRACT

A device for dispensing a fluid substance includes a cup-shaped outer container of glass, metal, or wood, and an intermediate element of plastic and configured to attach removably to the outer container and support at least an inner container and a hand pump coupled to the inner container for dispensing a substance contained therein, the outer container featuring a bottom and a side wall featuring a free end which defines an opening of the outer container, the side wall totally devoid of depressions or macroscopic reliefs that are functional to the coupling to the intermediate element, the intermediate element including a stop abutting on the free end of the side wall and at least a liner configured to penetrate the opening, the liner supporting at least an elastic element configured to friction couple to a part inside the container, on the said side wall.

15 Claims, 6 Drawing Sheets

DEVICE FOR DISPENSING A FLUID SUBSTANCE

This application claims priority to Italian Patent Application for Invention No. 102023000009144 file on May 8, 2023, the disclosure of which is hereby incorporated by reference.

FIELD OF THE INVENTION

The present invention relates to a fluid substance dispensing device.

In particular, it refers to a device for dispensing a fluid substance in which at least part thereof is refillable (once emptied) or reusable.

STATE OF THE ART

There are commonly known devices for dispensing fluid substances, such s creams or the like, which comprise a container and a hand pump coupled thereto. The activation of the pump allows the dispensing of a predetermined amount of fluid substance.

In some cases, the fluid substance is housed inside a deformable bag and the pump is of the airless kind. This way, the substance contained in the deformable bag is not contaminated by the outside air.

When all the substance contained in the commonly known devices has been dispensed, the said devices are thrown away.

In some cases, filling systems may be envisaged, which however force the consumer to perform difficult and far from simple operations.

In any case, even if refilling is possible, the commonly known devices are thrown away at the end of their life.

SUMMARY OF THE INVENTION

The object of the present invention is to provide a device which is improved compared with the prior art.

A further object of the invention is to provide a device which, once all the fluid substance has been dispensed, can comprise at least one part that can be put to a different use from that for which the said part was originally envisaged.

This and other objects are achieved by means of a dispensing device according to the technical teachings of the claims appended hereto.

Advantageously, the device can be refilled before the said part is reused.

BRIEF DESCRIPTION OF THE FIGURES

Further features and advantages of the innovation will become clearer in the description of a preferred but not exclusive embodiment of the device, illustrated—by way of a non-limiting example—in the drawings appended hereto, in which.

DETAILED DESCRIPTION OF THE INVENTION

Figure 1:
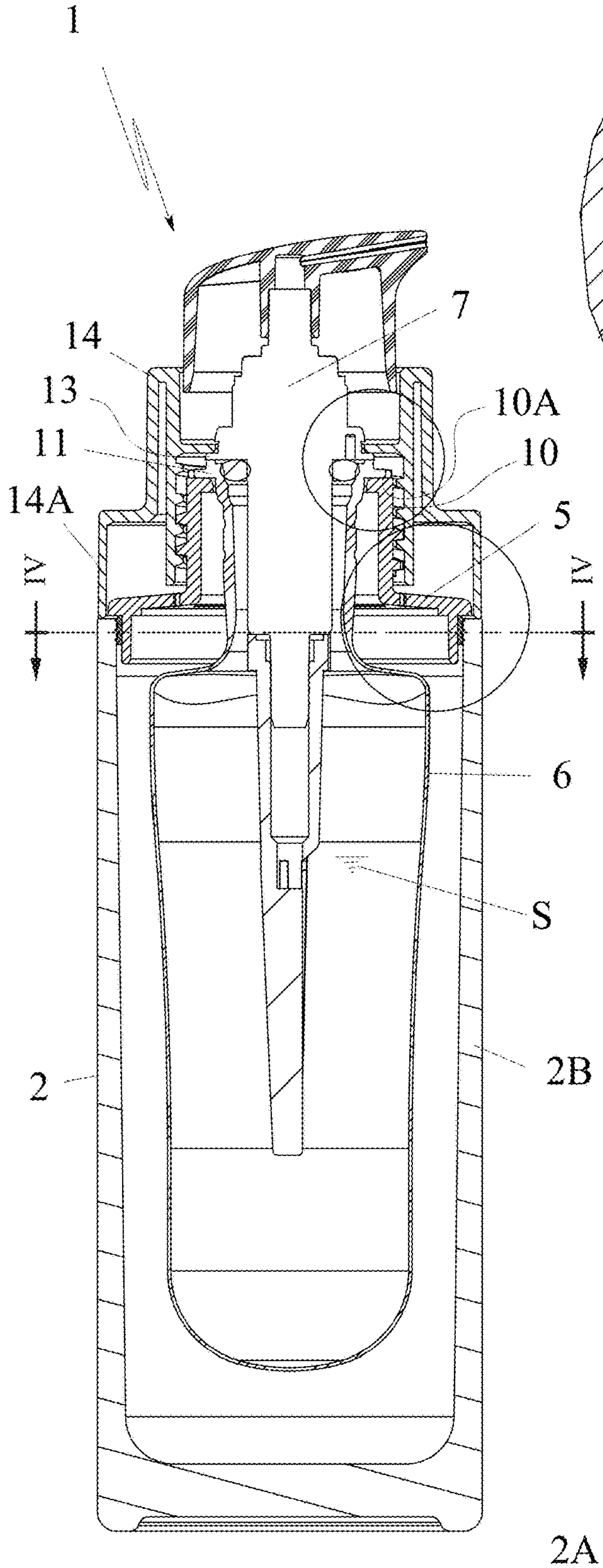
FIG. 1 is a sectional view of the device according to the present invention.

With reference to the figures stated, reference number 1 is used to denote, as a whole, a fluid substance dispensing device.

In this document, the term 'fluid substance' can mean a variably dense liquid, such as a cream, which is preferably used in the cosmetic or medical fields.

The fluid substance dispensing device 1 comprises a cup-shaped outer container 2 made of glass, metal, ceramic, or wood.

The device further comprises an intermediate element 5, 5' made of plastic and configured to attach removably to the outer container 2 and support at least an inner container 6, 60 and, directly or indirectly, a hand pump 7, the latter being sealedly coupled to the inner container 6, 60 for dispensing a substance S contained therein.

It should be noted that the outer container 2 features a bottom 2A and a side wall 2B.

The bottom 2A (or base) and the side wall 2B are preferably made as a single piece of glass. If the outer container 2 is made of metal or wood, it is also possible for the side wall and the bottom to be made as two separate pieces which are subsequently assembled in an essentially immovable manner.

In any case, the side wall 2B features a free end 3 which forms an opening 4 (or mouth) in the outer container 2.

According to the invention, the side wall 2B is totally devoid of depressions or macroscopic reliefs that are directly functional to the coupling with the intermediate element 5.

This way the outer container 2 can be used as a glass, a vase, or a generic container once separated from the intermediate element 5.

Advantageously, the side wall 2B of the outer container is cylindrical or polygonal (for example square, hexagonal, etc.). The base 2A can have a conformation which corresponds to the perimeter of a cross-section of the side wall 2B.

Advantageously, the opening 4 formed at the free end of the side wall 2B has a surface area which is comparable to or greater than that of the base 2A.

The side wall 2B can therefore be tapered towards the base 2A, with the side wall 2B slightly frusto-conical.

It should be noted that the outer surface of the side wall 2B may feature reliefs or depressions which, however, have a purely decorative purpose and are not functional to coupling with the intermediate element 5.

Therefore, the outer and/or inner face of the side wall 2B can also be finely decorated, including therein with relief decorations, painting, or treatments for particular surface finishes (such as acid etching, photo engraving, lasering, etc.), provided that such reliefs and depressions are simply decorations and in any case are not macroscopic reliefs that are directly functional to coupling with the intermediate element 5.

To clarify the point, the said decorative reliefs cannot form threads or grooves for snap-fastening.

In fact, when the outer container 2 is repurposed, it must not and cannot feature unsightly threads, grooves, or protrusions (for example, for snap-fastening purposes) as this would ruin the aesthetics of the said outer container 2, depending on the way in which it is repurposed (e.g. as a vase or glass).

The intermediate element 5, once removed, also removes the inner container 60, the pump, and any other element other than the outer container 2, thereby leaving the outer container 2 perfectly reusable or refillable.

Therefore, once the substance to be dispensed has finished, it is possible to keep the outer container 2, which—as already mentioned—can also be of very high-quality workmanship, and recouple it to a new intermediate element 5, 5' which, supporting the pump and the inner container 6, 60, serves as a refill.

For coupling to the outer container 2, the intermediate element comprises a stop 5A which abuts on the free end of the said side wall 2B, and at least a liner 8 configured to penetrate the said opening 4.

The stop 5A can be a flange or a step, as can be seen in FIGS. 2, 6, 8 and 10.

The liner 8 supports at least an elastic element 9 configured to friction couple to a part inside the container on the said side wall 2B. The elastic element 9 may be also referred as resilient element 9 in the description.

The elastic element 9 can be made of one or more of the following materials: PP-LDPE-HDPE-SILICONE-POLYAMIDE-EXPANDED POLYSTYRENE, RUBBER, or mixtures thereof.

The liner 8 can feature a perfectly cylindrical or slightly tapered configuration (therefore tapered towards the bottom 2A of the outer container 2), with outward taper angle (towards the wall 2B) of between 0.5 and 8°, preferably 2°.

In practice, the coupling between the intermediate element 5, 5' and the outer container occurs only at the elastic element 9, thereby making a coupling that can be uncoupled by hand possible.

Note that the elastic element 9 can simply be fitted onto the liner 8, or the elastic element 9 can be co-moulded with the intermediate element 5, exactly at the liner 8.

Figure 4A:
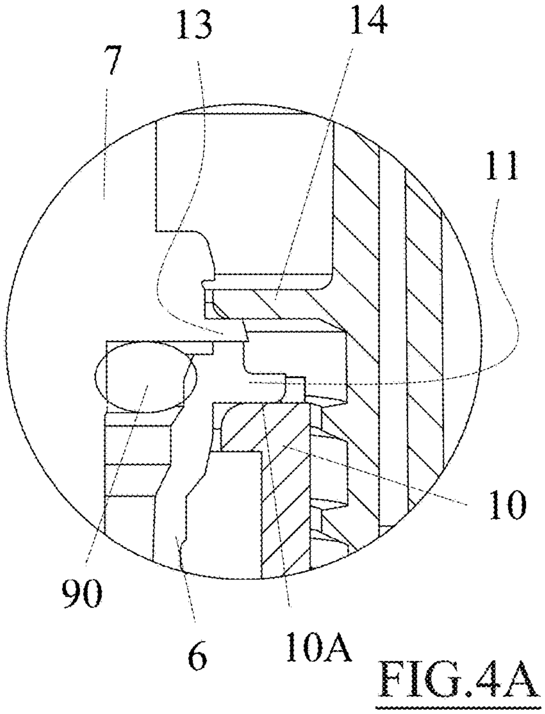
FIG. 4A (page 2) is an enlargement of the part shown in the smaller circle in FIG. 1.
Figure 6:
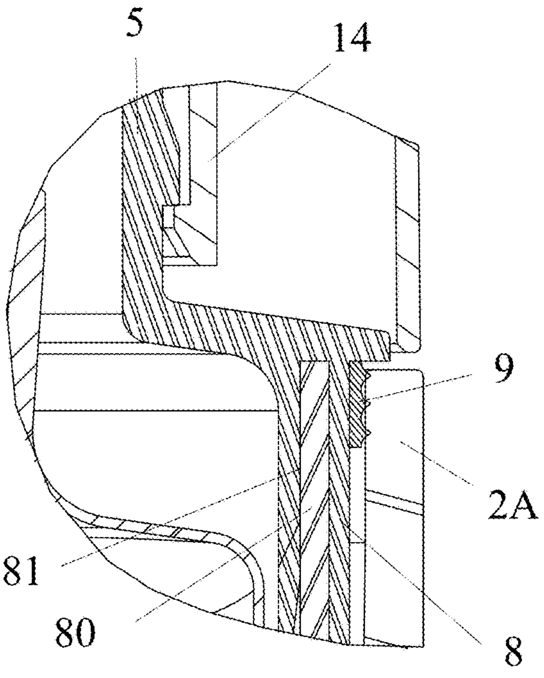
FIG. 6 is an enlargement of the part circled in FIG. 5.
Figure 7:
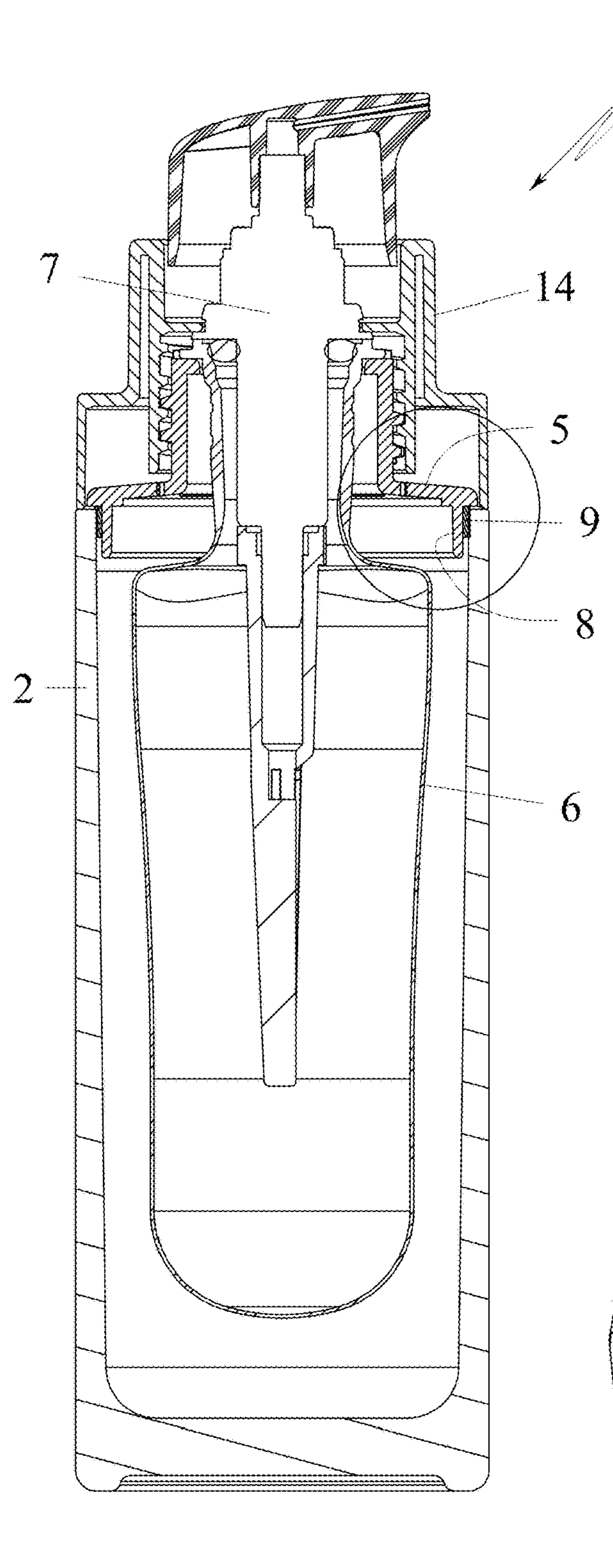
FIG. 7 is a sectional view of a variant of the device in FIG. 1.
Figure 4:
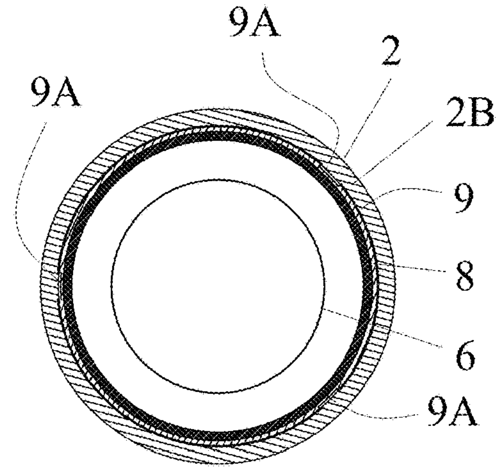
FIG. 4 (page 3) is a simplified sectional view taken along line IV-IV in FIG. 1.

As can be seen in FIG. 4, the shape of the liner 8 (shown in a sectional view) can correspond to that of the side wall 2B at the opening 3.

The shape of the elastic element 9 can also correspond to that of the opening 3 (shown in a sectional view). The elastic element can completely cover or surround the liner 8.

Furthermore, the liner 8 (shown in a sectional view, see again FIG. 4) can be devoid of vertical gaps or lightened areas, as these would make the said liner too deformable, therefore weakening the fastening between the outer container 2 and the intermediate element 5.

Figure 2:
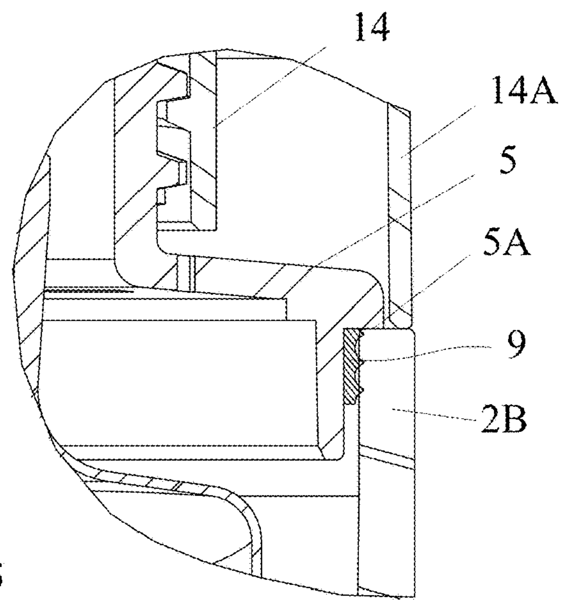
FIG. 2 is an enlargement of the part shown in the larger circle in FIG. 1.
Figure 3:
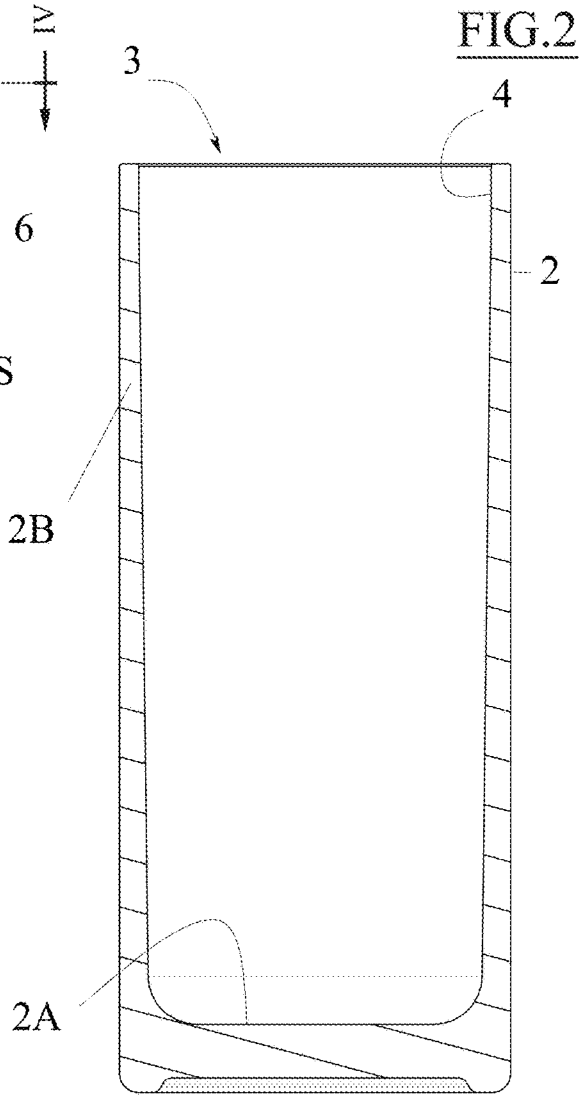
FIG. 3 is a sectional view of an outer container, which can also be repurposed, of the device in FIG. 1.

As visible in the detail shown in FIG. 2, the elastic element 9 can feature a surface for contact with the said side wall 2B, the said surface being endowed with reliefs and depressions.

The said reliefs and depressions can be essentially perimetral and distributed continuously over the entire outer perimeter surface (the surface facing wall 2B) of the elastic element.

Advantageously, the depressions and reliefs are defined by perimetral grooves (annular grooves) featured on the contact surface between the elastic element and the side wall 2B.

Two contiguous annular grooves may define a single annular relief.

The seal (or elastic element 9) is configured to offset even considerable tolerances of the outer container 2, therefore it can also feature a significant thickness (sectionally), which advantageously measures between 0.15 and 1 mm, preferably between 0.30 and 0.80 mm.

As can be seen in the sectional view in FIG. 4, notches 9A can be featured to release any air inside the container when under slight pressure, which may have been trapped during the operations to couple the intermediate element 5 and the outer container 2.

These notches 9A can extend vertically in the elastic element so as to connect a surface thereof facing the inside of the inner container with a surface thereof facing the intermediate element 5.

Figure 8:
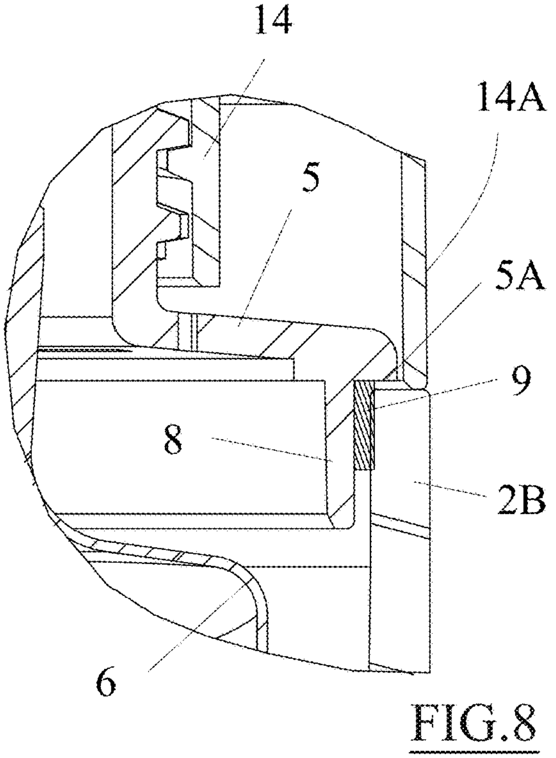
FIG. 8 is an enlargement of the part circled in FIG. 7.

Or, as in FIG. 8, the elastic element 9 can simply feature a surface for contact with the said perfectly smooth side wall 2B.

Figure 10:
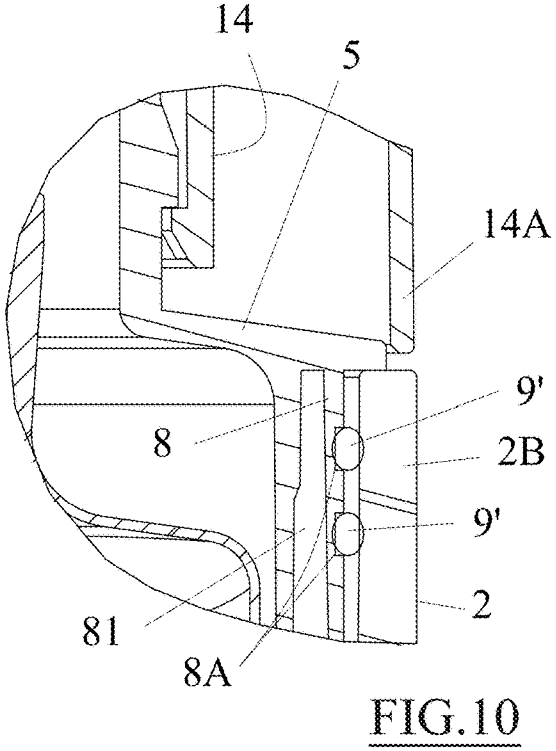
FIG. 10 is an enlargement of the part circled in FIG. 9.

Furthermore, as visible in the detail in FIG. 10, the elastic element 9 can be a simple O-ring 9', housed in a special annular seat 8A in the intermediate element 5.

The seat 8A can be made in the liner 8.

Preferably, the intermediate element 5 features two annular seats 8A, each one housing an O-ring 9'.

Continuing with the description relating to the configurations of FIGS. 1, 5, 7, and 9, it is noted that the intermediate element 5 can form a neck 10 with a smaller diameter than that of the opening 4 formed by the free end 3 of the said side wall 2B.

The diameter of the neck 10 can be similar to that of conventional containers, precisely to allow the connection with a conventional—albeit airless—pump 7.

The neck 10 (see the detail in FIG. 4A, on page 2) can be endowed with a free end 10A on which a first flange 11 of the inner container 6 rests, the said container being a deformable bag housed in the outer container 2.

A second flange 13 of the pump 7 can be placed on the first flange 11 (or a raised part thereof).

The device can also comprise a ring nut 14 locked to the said neck 10, the first flange 11 (of the bag) and the second flange 13 (of the pump) being sandwiched between the said free end 10A and the said ring nut 14.

Note that, if the ring nut 14 is present, it may feature a skirt 14A. For aesthetic reasons, the skirt 14A can preferably be aligned (subject to the normal manufacturing tolerances of the outer container, which also depend on the material and the manufacturing technologies with which the said container is made) with the outer perimeter of the side wall 2B, so that the coupling between the outer container 2 and the intermediate element 5 is devoid of obvious steps or changes in diameter.

Figure 5:
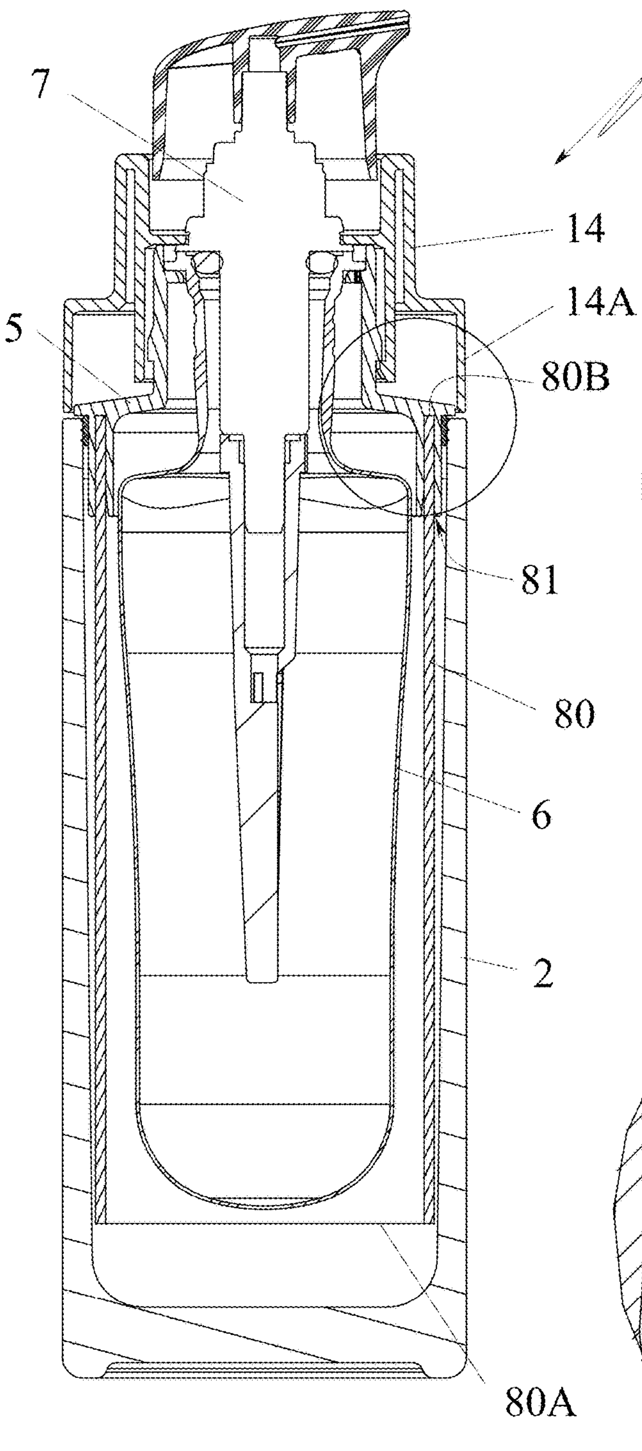
FIG. 5 is a sectional view of a variant of the device in FIG. 1.
Figure 9:
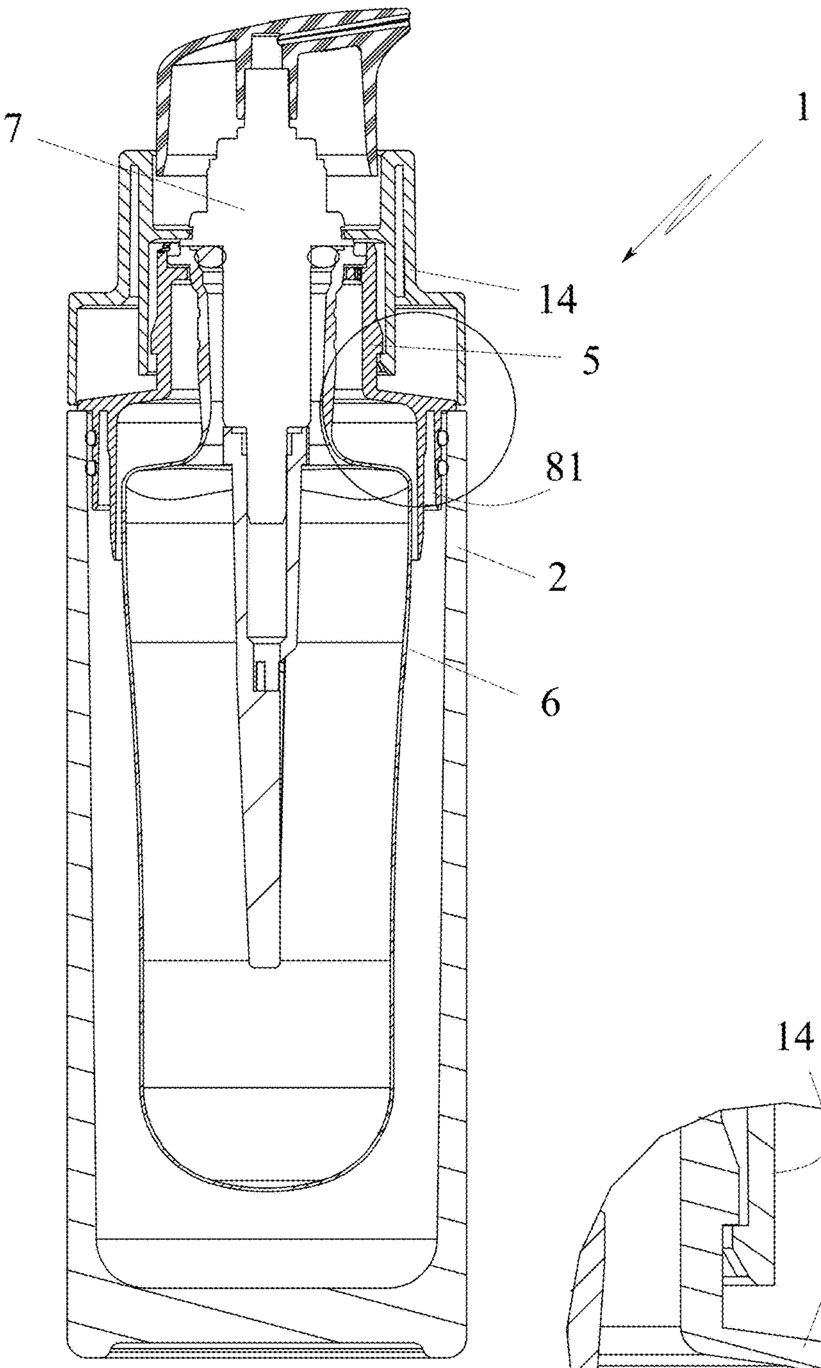
FIG. 9 is a sectional view of a variant of the device in FIG. 1.

Obviously, the ring nut 14 can be locked to the neck 10 by means of a thread (as in FIGS. 1 and 7) or by means of a snap-fastening as shown in FIGS. 5 and 9.

An appropriate seal 90 can be featured between the (airless) pump 7 and the inner container, which guarantees a perfect seal.

Now reference will be made to FIG. 11 and the following figures, which show a slightly different configuration of the device 1.

Here, both the intermediate element 5' and the inner container 60 have a different configuration from those illustrated previously.

The intermediate element 5' can form a cup 61 endowed, on one of the inner walls thereof, with means for coupling to a neck 62 of the inner container 60, the said neck 62 being housed in the cup 61.

Figure 13:
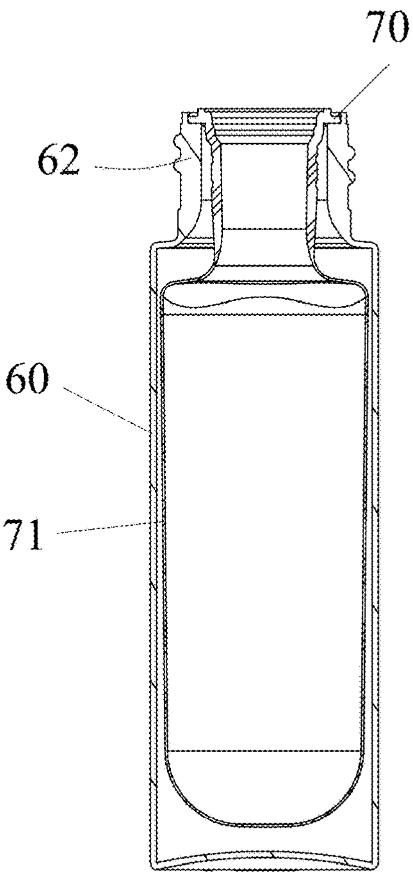
FIG. 13 shows, in a sectional view, a part of the device in FIG. 11.

The inner container 60 can be seen more clearly in FIG. 13.

It should be noted that the coupling means between the neck 62 of the inner container and the cup 61 can, alternatively, be threaded 72 or snap-fastening (not shown).

The top of the cup 61 can be formed by a flange wall 25 (bored for the passage of the pump 7).

A second flange 13 of the pump 7 can rest on the flange wall 25. Consequently, the free end 70 of a deformable bag 71 housed in the inner container 60 can rest on the second flange 13 of the pump 7, on the side opposite that on which it rests on the flange wall 25.

In practice, therefore, the second flange 13 of the pump and the free end 70 (which may also have a flange conformation) of the deformable bag 71 are sandwiched between the free end of the inner container 60 (at the mouth thereof) and the flange wall 25 of the intermediate element 5'.

Figure 12:
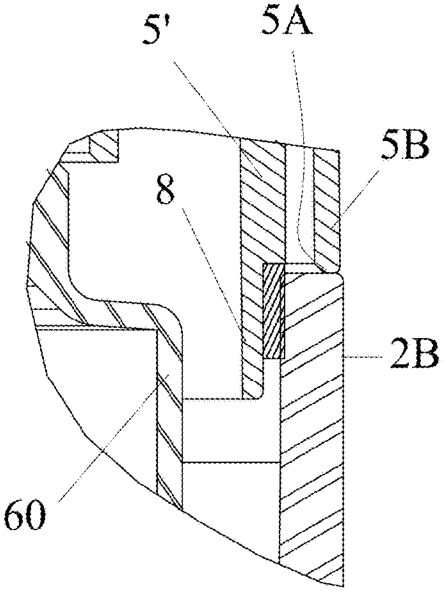
FIG. 12 is an enlargement of the part circled in FIG. 10.

In this configuration, the stop 5A can be the free end of an outer skirt 5B of the intermediate element 5', as can be seen clearly in FIG. 12.

It should be noted that for aesthetic reasons, the outer skirt 5B can preferably be aligned with the outer perimeter of the side wall 2B, so that the coupling between the outer container 2 and the intermediate element 5' is devoid of obvious steps or changes in diameter.

It has been seen that the ring nut 14 shown in the configurations described above is not featured in this configuration. The different conformation of the intermediate element 5' is designed to support an inner container 60 with its own (therefore essentially rigid) structure, which houses the deformable bag 71.

Figure 11:
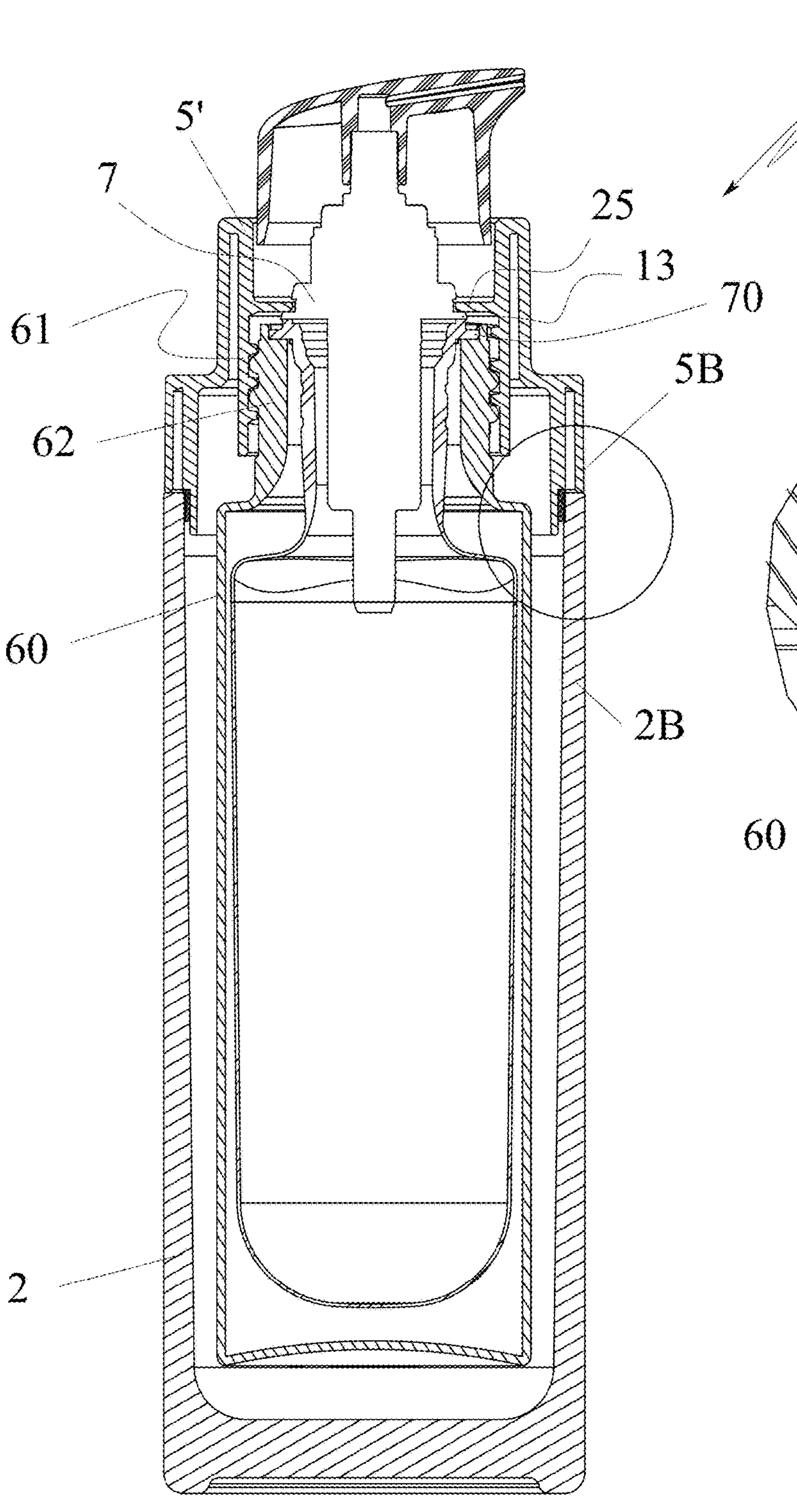
FIG. 11 is a sectional view of a still further variant of the device in FIG. 1.
Figure 14:
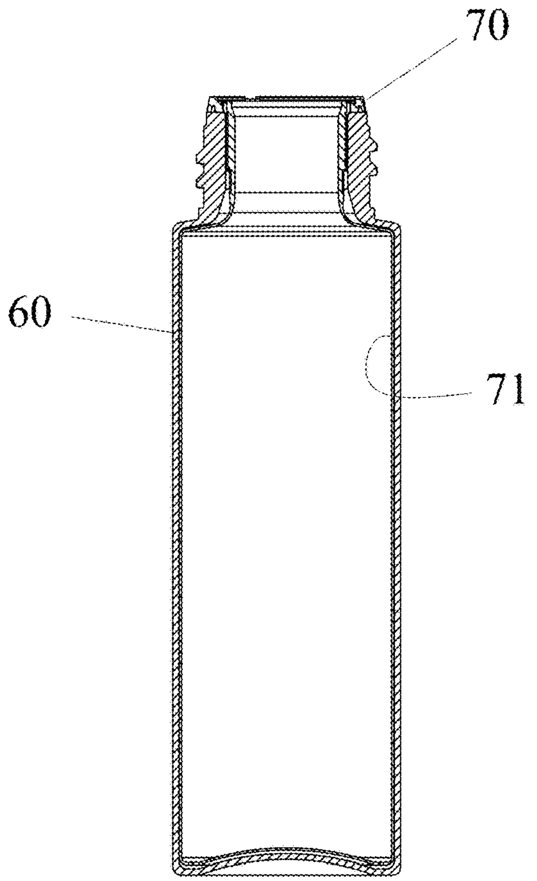
FIG. 14 shows, also in a sectional view, a further variant of the part in FIG. 13.

The deformable bag 71 can be a separate piece from the inner container 60, as in FIGS. 11 and 13, or it can be an (at least partial) inner lining which can detach from the inner container 60 as a result of the vacuum generated by the pump 7 during use (as in FIG. 14).

It should be noted that inner container 60 shaped thus is suitable to be closed, for example by a screw-on or snap-on cap, so that it can be sold separately as an individual refill unit.

Figure 15:
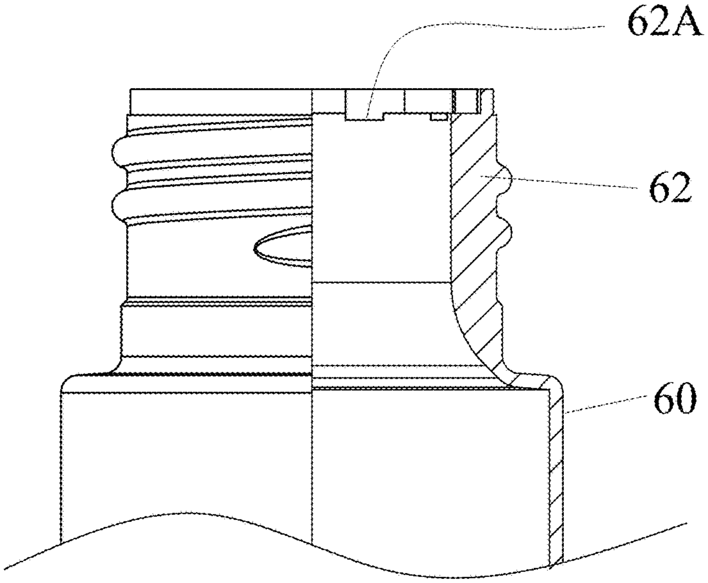
FIG. 15 is a partially sectioned view of a detail of the device in FIG. 11.

As can be seen in FIG. 15, the neck 62 of the inner container 60 can feature recesses 62A that allow outer air into the said neck as the deformable bag 71 empties.

To end the description, it must be highlighted that the device 1 can comprise a decorative element 80 fastened to the intermediate element 5 or 5' arranged internally to the outer container 2 and configured to at least partially hide the inner container 6 from view, which can be seen through the wall 2B of the outer container 2.

An example is shown in FIG. 5.

For example, the decorative element 80 can have a tubular configuration (with a circular section for example) with an open bottom end 80A and an upper end 80B inserted and fastened in a groove 81 formed in the intermediate element 5.

Note that the decorative element 80 can also be applied to the configuration of FIG. 11, simply by creating a groove in the intermediate element 5' featured (diametrally) inside the liner 8.

The decorative element 80 can be a printed tubular card (preferably cardboard), or a decorated cylindrical element made for example of plastic.

If the decorative element 80 is in cardboard or plastic, it may have the additional technical function to aid the insertion of the inner container 6, 60 (attached to the pump and to the intermediate element) inside the outer container 2 (both when assembling the dispensing device or in a refill operation).

Moreover, it can protect the inner container 6, 60 during its transportation, for example when moved or stored outside the outer container.

I should finally be noted that the decorative element may be removed from the intermediate element 5, 5' (for example when the intermediate element together with the deformable bag and the pump is removed from the outer container) to improve recyclability of the device.

Various embodiments of the innovation have been disclosed herein, but further embodiments may also be conceived using the same innovative concept.

The invention claimed is:

1. A dispensing device (1) of a fluid substance, comprising an outer container (2) that is cup-shaped and made of glass, metal, ceramic or wood, and an intermediate element (5, 5') made of plastic configured to attach removably to the outer container (2) and support at least one inner container (6), and, directly or indirectly, a hand pump (7) coupled to the inner container (6, 60) to dispense a substance(S) contained therein, the outer container (2) having a bottom (2A) and a side wall (2B), the side wall (2B) having a free end (3) defining an opening (4) of the outer container (2), the side wall (2B) being totally devoid of macroscopic depressions or reliefs functional for coupling with the intermediate element (5), the intermediate element comprising a stop (5A) resting against the free end of said side wall (2B) and at least one liner (8) configured to penetrate said opening (4), the liner (8) supporting at least one elastic element (9) configured to frictionally couple to an inner part of the container, on said side wall (2B), a decorative element (80) being attached to the intermediate element (5, 5') and arranged internally to the outer container (2) configured to at least partially hide the inner container (6, 60) from view through the wall (2B) of the outer container (2).

2. The dispensing device (1) according to claim 1, wherein the decorative element (80) has a tubular configuration with a bottom end (80A) open and with a top end (80B) inserted and fixed in a groove (81) defined in the intermediate element (5).

3. The dispensing device (1) according to claim 1, wherein the elastic element (9) is provided with a contact surface with said side wall (2B) having reliefs and depressions or wherein the depressions and reliefs are formed on the outer perimeter of the elastic element (9) and distributed continuously over the entire outer perimeter surface facing the wall (2B) of the elastic element (9).

4. The dispensing device (1) according to claim 1, wherein the depressions and reliefs are defined by perimetral annular grooves featured on the elastic element (9) on the contact surface between the elastic element and the side wall (2B) and/or wherein two contiguous annular grooves define a single annular relief.

5. The dispensing device according to claim 1, wherein the elastic element (9) provides a contact surface with said side wall (2B) that is smooth.

6. The dispensing device according to claim 1, wherein the elastic element (9) is an O-ring, housed in a suitable annular seat (8A) of the intermediate element (5), the intermediate element (5) providing two annular seats (8A) each housing an O-ring.

7. The dispensing device according to claim 1, wherein the elastic element (9) is co-molded with the intermediate element (5).

8. The dispensing device according to claim 1, wherein the intermediate element (5) defines a neck (10) having a smaller diameter than the diameter of the opening defined by the free end of said side wall (2B), the neck (10) being provided with a free end (10A) on which rests a first flange (11) of the inner container (6) which is a deformable bag housed in the outer container (2), on the first flange (11) resting a second flange (13) of the pump (7), the device further comprising a nut (14) locked to said neck (10), the first flange (11) and the second flange (13) being sandwiched between said free end (10A) and said nut (14).

9. The dispensing device according to claim 8, wherein the nut (14) is locked to the neck (10) by a thread or by a snap coupling.

10. The dispensing device according to claim 1, wherein the intermediate element (5') defines a cup (61) having, on an inner wall thereof, coupling means for engaging with a neck (62) of the inner container (60), the neck (62) being at least partially housed in the cup (61).

11. The dispensing device according to claim 10, wherein the top of the cup (61) is defined by a flange wall (25), to the flange wall (25) resting a second flange (13) of the pump, to the second flange (13) of the pump (7), on the opposite side from the flange wall (25) resting the free end (70) of a deformable bag (71) housed in the inner container (60).

12. The dispensing device according to claim 11, wherein the deformable bag (71) is a separate piece from the inner container (60), or is at least a partial, detachable inner lining of the inner container (60).

13. The dispensing device according to claim 10, wherein the coupling means comprises a snap-on coupling or a thread (72).

14. The dispensing device according to claim 1, wherein said side wall (2B) of the outer container is cylindrical or polygonal, the outer surface of the side wall presenting decorative reliefs or depressions.

15. The dispensing device according to claim 1, wherein said side wall (2B) is made in a single piece with the bottom (2A) of the outer container (2).

* * * * *